(12) United States Patent
Ueno et al.

(10) Patent No.: US 10,145,329 B2
(45) Date of Patent: Dec. 4, 2018

(54) CONTROL SYSTEM FOR INTERNAL COMBUSTION ENGINE

(71) Applicant: HONDA MOTOR CO., LTD., Tokyo (JP)

(72) Inventors: Masaki Ueno, Wako (JP); Akio Futatsudera, Wako (JP); Masaya Agata, Wako (JP); Hisashi Ito, Wako (JP); Hideharu Takamiya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 73 days.

(21) Appl. No.: 13/961,974

(22) Filed: Aug. 8, 2013

(65) Prior Publication Data

US 2014/0067212 A1 Mar. 6, 2014

(30) Foreign Application Priority Data

Aug. 30, 2012 (JP) ................................ 2012-189718

(51) Int. Cl.
*B60W 10/04* (2006.01)
*B60W 10/10* (2012.01)
(Continued)

(52) U.S. Cl.
CPC .............. *F02D 43/04* (2013.01); *B60K 6/485* (2013.01); *B60W 10/06* (2013.01); *B60W 20/00* (2013.01);
(Continued)

(58) Field of Classification Search
CPC ............. F02D 41/2416; F02D 41/0002; F02D 2041/002; F02D 43/04; F02D 11/105;
(Continued)

(56) References Cited

U.S. PATENT DOCUMENTS 5,505,174 A * 4/1996 Komoriya ........... F02D 41/0072
  123/406.48
5,857,437 A * 1/1999 Yoshioka ................ F01L 1/344
  123/90.15

(Continued)

FOREIGN PATENT DOCUMENTS

DE      43 22 281 A1    1/1995
DE      195 42 046 A1   5/1996
(Continued)

OTHER PUBLICATIONS

Japanese Office Action application No. 2012-189718 dated Apr. 1, 2014.

(Continued)

*Primary Examiner* — Adam D Tissot
*Assistant Examiner* — Aaron C Smith
(74) *Attorney, Agent, or Firm* — Squire Patton Boggs (US) LLP

(57) ABSTRACT

A control system for an internal combustion engine, which is capable of quickly and properly ensuring excellent fuel economy of the engine even when atmospheric pressure has changed. The control system includes an ECU. The ECU performs weighted average calculation on lowland map values and highland map values, based on atmospheric pressure, to thereby calculate map values of a demanded torque that minimize a fuel consumption ratio of the engine in the atmospheric pressure, and calculates engine demanded output. The ECU calculates demanded torque and demanded engine speed using the map values and the engine demanded output, respectively. The ECU controls the engine using the demanded torque.

8 Claims, 12 Drawing Sheets

(51) Int. Cl.

| | |
|---|---|
| *F02D 43/04* | (2006.01) |
| *B60K 6/485* | (2007.10) |
| *B60W 10/06* | (2006.01) |
| *B60W 20/00* | (2016.01) |
| *F02D 41/24* | (2006.01) |
| *F02D 11/10* | (2006.01) |
| *F02D 41/00* | (2006.01) |
| *B60W 30/188* | (2012.01) |

(52) U.S. Cl.
 CPC .......... *F02D 11/105* (2013.01); *F02D 41/005* (2013.01); *F02D 41/2422* (2013.01); *B60W 30/1882* (2013.01); *B60W 2550/12* (2013.01); *B60W 2710/0666* (2013.01); *F02D 2200/703* (2013.01); *Y02T 10/47* (2013.01); *Y02T 10/6226* (2013.01)

(58) Field of Classification Search
 CPC .. F02D 41/2422; F02D 41/005; B60W 10/06; B60W 10/11; B60W 20/00; B60K 6/485
 USPC .............. 701/22, 51; 123/399, 435
 See application file for complete search history.

(56) References Cited

U.S. PATENT DOCUMENTS

| | | | | |
|---|---|---|---|---|
| 5,973,460 | A * | 10/1999 | Taga | ........................ B60K 6/26 318/139 |
| 6,311,679 | B1 * | 11/2001 | Druzhinina | ............. F02B 47/08 123/399 |
| 6,367,447 | B1 * | 4/2002 | Palansky et al. | ............. 123/361 |
| 8,224,539 | B2 * | 7/2012 | Heap | ...................... B60K 6/365 180/65.275 |
| 8,813,885 | B2 * | 8/2014 | Heap | ...................... B60W 10/06 180/65.265 |
| 2008/0059032 | A1 * | 3/2008 | Hofmann | ................. B60K 6/48 701/55 |
| 2009/0063007 | A1 | 3/2009 | Masuda | |
| 2013/0217539 | A1 * | 8/2013 | Natsume | .................. B60K 6/48 477/52 |

FOREIGN PATENT DOCUMENTS

| | | |
|---|---|---|
| DE | 101 29 314 A1 | 1/2002 |
| DE | 102 06 155 A1 | 9/2002 |
| DE | 103 03 471 A1 | 8/2003 |
| DE | 10 2004 024 864 B4 | 2/2005 |
| JP | 07-127516 A | 5/1995 |
| JP | 10-252573 A | 9/1998 |
| JP | 10-339153 A | 12/1998 |
| JP | 2006-170054 A | 6/2006 |
| JP | 2006-193137 A | 7/2006 |

OTHER PUBLICATIONS

German Search Report file No. 10 2012 217 162.5 dated Dec. 19, 2013.

Japanese Office Action application No. 2012-189718 dated Nov. 11, 2014.

* cited by examiner

F I G. 15A
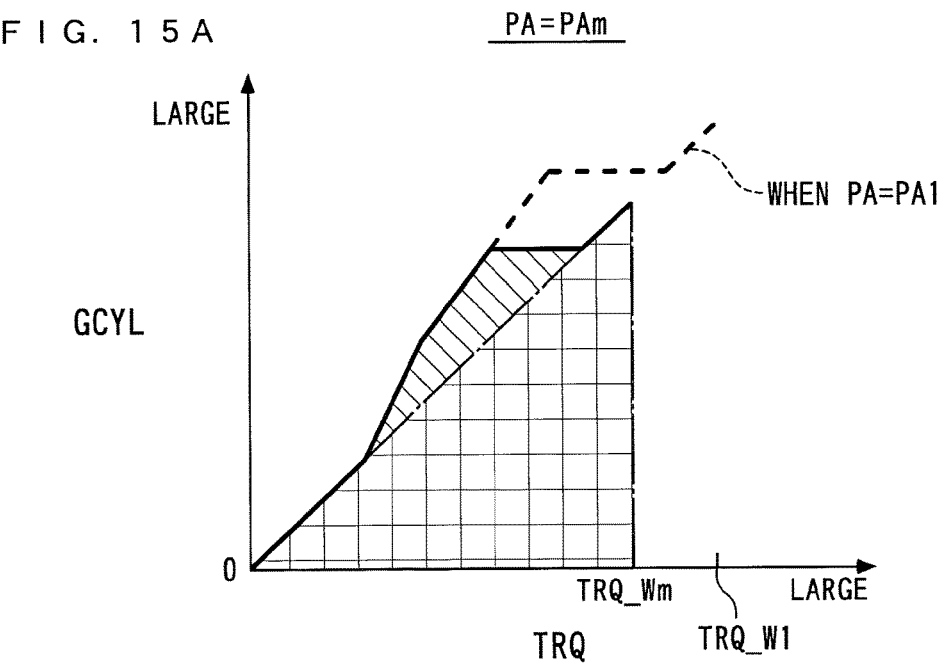
F I G. 15B
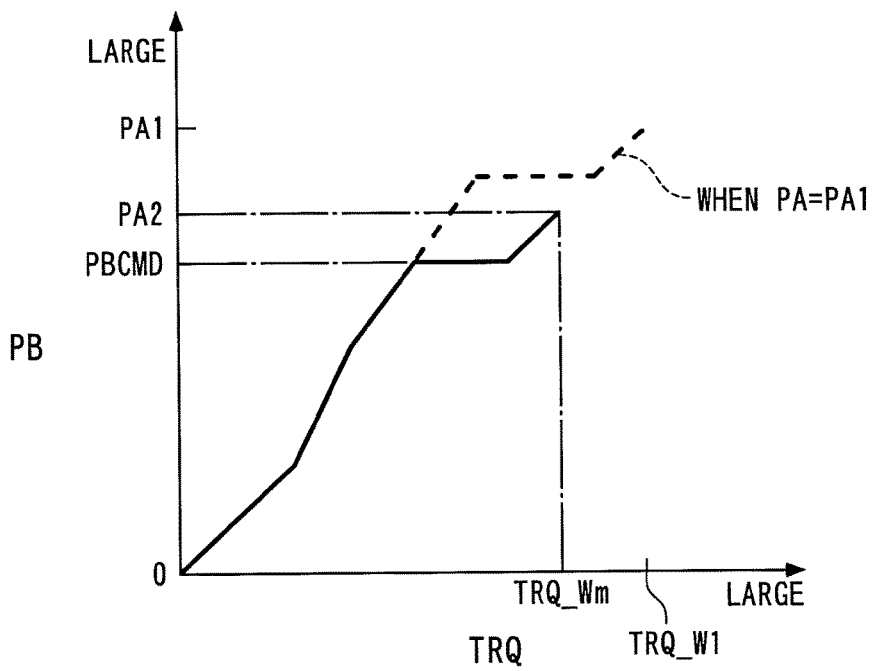

CONTROL SYSTEM FOR INTERNAL COMBUSTION ENGINE

BACKGROUND OF THE INVENTION

Field of the Invention

The present invention relates to a control system for an internal combustion engine, for controlling the engine such that a fuel consumption ratio is minimized.

Description of the Related Art

A conventional control system for an internal combustion engine is disclosed in Japanese Laid-Open Patent Publication (Kokai) No. 2006-193137. This engine is installed on a hybrid vehicle as a motive power source. The control system has a control map in which are set a large number of operating point data items that define the relationship between the rotational speed of the engine and an engine torque, a reference operating line Q connecting the operating point data items, and nine equal output lines Pi (i=1 to 9) associated with nine engine outputs, respectively.

In this control system, an operating point-learning process shown in FIG. 4 of the mentioned publication is executed during operation of the engine such that a fuel consumption ratio is minimized. In this learning process, in a step A11, an operating point on one of the equal output lines Pi (hereinafter referred to as the "currently set operating point"), associated with an output demanded of the engine, is referred to, and in a step A12, a fuel consumption ratio is calculated based on data of the rotational speed of the engine and an engine torque on the currently set operating point. Further, in a step A13, it is determined whether or not the calculated fuel consumption ratio is minimum. If it is determined that the calculated fuel consumption ratio is not minimum, when the output of an electric motor can cover the engine output, the process proceeds to the step A11 again, wherein the operating point is changed from the currently set operating point to a different point on the equal output line Pi, and in the step A13, it is determined whether or not a fuel consumption ratio associated with the changed operating point is minimum. If it is determined that the calculated fuel consumption ratio is not minimum, in a step A14, it is determined whether or not the output of the electric motor can cover the engine output. If it is determined that the output of the electric motor cannot cover the engine output, the present process is immediately terminated.

On the other hand, when it is determined that the output of the electric motor can cover the engine output, the process returns to the step A11. More specifically, when it is determined that the calculated fuel consumption ratio is not minimum, if it is determined that the output of the electric motor can cover the engine output, the above-described steps A11 to A14 are repeatedly executed until an operating point that minimizes the fuel consumption ratio (hereinafter referred to as an "optimum operating point") is determined. When the optimum operating point is determined, an optimum operating point stored in a memory is updated to the determined optimum operating point and stored in respective steps A15 and A16, followed by terminating the learning process.

The above-described conventional control system is configured such that the process for searching for an optimum operating point is repeatedly executed until the optimum operating point is determined, and hence, for example, when atmospheric pressure has changed, it takes time to determine an optimum operating point in a manner coping with the change in the atmospheric pressure, and during the time period, it is impossible to operate the engine such that the fuel consumption ratio is minimized. This can result in the degraded fuel economy.

SUMMARY OF THE INVENTION

It is an object of the present invention to provide a control system for an internal combustion engine, which is capable of quickly and properly ensuring excellent fuel economy of the engine even when atmospheric pressure has changed.

To attain the above object, the present invention provides a control system for an internal combustion engine, comprising atmospheric pressure-detecting means for detecting atmospheric pressure, demanded output parameter-calculating means for calculating a demanded output parameter indicative of an output demanded of the engine, optimum fuel economy operating point data-calculating means having, on a coordinate plane in which an engine speed as a rotational speed of the engine and a torque parameter indicative of a torque to be generated by the engine are set as coordinate axes, a plurality of first operating point data items that define a relationship between the engine speed and the torque parameter such that a fuel consumption ratio in a first predetermined state of the atmospheric pressure is minimized, and a plurality of second operating point data items that define a relationship between the engine speed and the torque parameter such that the fuel consumption ratio in a second predetermined state of the atmospheric pressure which is different from the first predetermined state is minimized, for calculating a plurality of optimum fuel economy operating point data items that minimize the fuel consumption ratio under a detected atmospheric pressure, by performing interpolation on the plurality of first operating point data items and the plurality of second operating point data items, based on the detected atmospheric pressure, demanded value-calculating means for calculating a demanded torque parameter demanded as the torque parameter and a demanded engine speed demanded as the engine speed, using the calculated optimum fuel economy operating point data items and the calculated demanded output parameter, and control means for controlling the engine using the calculated demanded torque parameter.

With the configuration of this control system, a plurality of optimum fuel economy operating point data items that minimize the fuel consumption ratio under the detected atmospheric pressure are calculated by performing interpolation, based on the detected atmospheric pressure, on the plurality of first operating point data items that define the relationship between the engine speed and the torque parameter such that the fuel consumption ratio in the first predetermined state of the atmospheric pressure is minimized and the plurality of second operating point data items that define the relationship between the engine speed and the torque parameter such that the fuel consumption ratio in the second predetermined state of the atmospheric pressure different from the first predetermined state is minimized. Therefore, it is possible to calculate the plurality of optimum fuel economy operating point data items more quickly than when the process for searching for an optimum operating point is repeatedly executed as disclosed in Japanese Laid-Open Patent Publication (Kokai) No. 2006-193137. Further, the demanded torque parameter demanded as the torque parameter and the demanded engine speed demanded as the engine speed are calculated using the optimum fuel economy operating point data items and the demanded output parameter calculated as above, and the engine is controlled using the demanded torque parameter, so that it is possible to operate the engine in a state where the fuel consumption ratio is minimized with respect to the detected atmospheric pressure. This makes it possible to quickly and properly ensure excellent fuel economy of the engine even when the atmospheric pressure changes between the first predetermined state and the second predetermined state.

Preferably, the engine includes an EGR device for recirculating exhaust gases, with the first predetermined state being set to a state of the atmospheric pressure on a lowland, and the second predetermined state being set to a state of the atmospheric pressure on a region higher than the lowland, and the control means controls an amount of exhaust gases recirculated by the EGR device, using the demanded torque parameter, such that when the atmospheric pressure is closer to the second predetermined state than to the first predetermined state, the amount of recirculated gases is made smaller than when the atmospheric pressure is in the first predetermined state.

With the configuration of the preferred embodiment, the amount of gases recirculated by the EGR device is controlled using the demanded torque parameter such that when the atmospheric pressure is closer to the second predetermined state than to the first predetermined state, the amount of recirculated gases is made smaller than when the atmospheric pressure is in the first predetermined state. More specifically, when the engine is used in a region higher than the lowland, the amount of recirculated gases is controlled to be smaller than when the engine is used on the lowland, so that it is possible properly secure torque represented by the demanded torque parameter even in such a region.

Preferably, the first predetermined state is set to a state of the atmospheric pressure on a lowland, and the second predetermined state is set to a state of the atmospheric pressure on a highest land in regions where the engine is assumed to be used.

With the configuration of the preferred embodiment, the first predetermined state is set to the state of the atmospheric pressure on the lowland, and the second predetermined state is set to the state of the atmospheric pressure on the highest land in the regions where the engine is assumed to be used. Therefore, it is possible to obtain the same advantageous effects as described above, also when the engine is used between the lowland and the highest land.

Preferably, the engine is used as a motive power source of a vehicle including an automatic transmission, and the control means controls an operating state of the automatic transmission using the demanded engine speed.

With the configuration of the preferred embodiment, the operating state of the automatic transmission of the vehicle that uses the engine as the motive power source is controlled using the demanded engine speed. Therefore it is possible to operate the engine while ensuring a minimum fuel consumption ratio, such that the torque represented by the demanded torque parameter and the demanded engine speed can be obtained.

The above and other objects, features, and advantages of the present invention will become more apparent from the following detailed description taken in conjunction with the accompanying drawings.

BRIEF DESCRIPTION OF THE DRAWINGS

FIG. 15A is a diagram showing a relationship between the demanded torque and the in-cylinder gas amount, obtained when PA=PAm holds;

FIG. 15B is a diagram showing a relationship between the demanded torque and the intake pressure, obtained when PA=PAm holds;

DETAILED DESCRIPTION OF PREFERRED EMBODIMENTS

Figure 1:
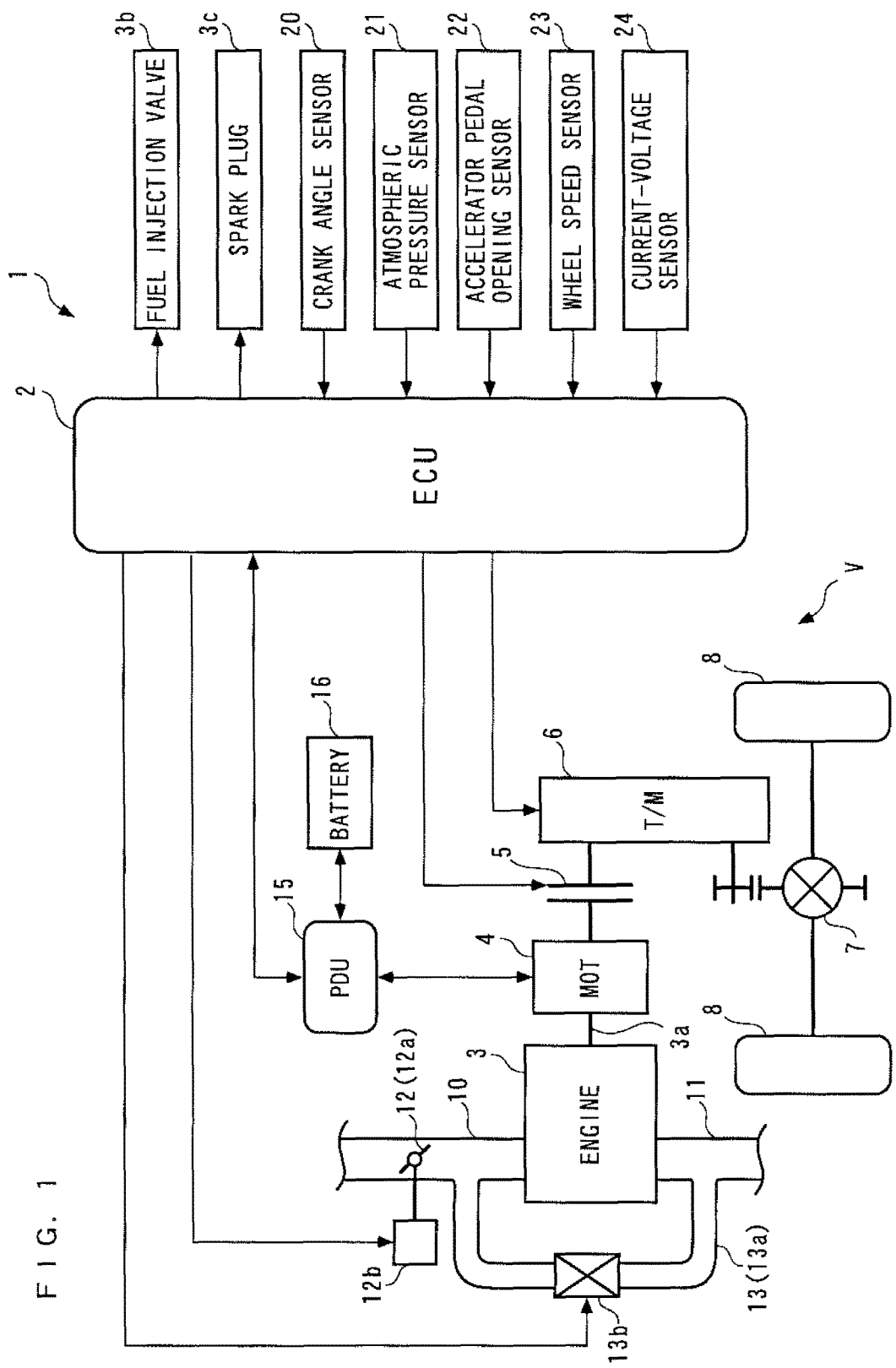
FIG. 1 is a schematic diagram of a control system according to an embodiment of the present invention and a hybrid vehicle employing an internal combustion engine as a motive power source.

Hereafter, a control system for an internal combustion engine according to an embodiment of the invention will be described with reference to drawings. As shown in FIG. 1, the internal combustion engine 3 to which the control system 1 according to the present embodiment is applied is installed on a hybrid vehicle (hereinafter referred to as the "vehicle") V. This vehicle V includes not only the internal combustion engine 3 but also an electric motor 4 as motive power sources. The control system 1 controls operating conditions of the internal combustion engine 3 and the electric motor 4, and is equipped with an ECU 2.

In the vehicle V, a crankshaft 3a of the internal combustion engine (hereinafter referred to as the "engine") 3 is directly connected to a rotating shaft of the electric motor 4, and the electric motor 4 is mechanically connected to left and right front wheels 8 and 8 via a clutch 5, an automatic transmission 6, a differential gear mechanism 7, and so forth. The clutch 5 is an electromagnetic clutch, and is electrically connected to the ECU 2. The engaged/disengaged state of the clutch 5 is controlled by a control signal input from the ECU 2.

Further, the automatic transmission 6 is formed by a belt CVT (continuously variable transmission), and is equipped with a CVT actuator (not shown) electrically connected to the ECU 2. In the automatic transmission 6, the CVT actuator is driven by a control signal input from the ECU 2, whereby the transmission ratio thereof is controlled. With the above arrangement, when the clutch 5 is engaged, outputs of the engine 3 and the electric motor 4 are transmitted to the front wheels 8 and 8. On the other hand, at the start of the engine 3, the output from the electric motor 4 is transmitted to the engine 3 in the disengaged state of the clutch 5. Further, the vehicle V includes left and right rear wheels (not shown), which are idler wheels.

The engine 3 is a multi-cylinder engine powered by gasoline, and includes fuel injection valves 3b (only one of which is shown in FIG. 1) and spark plugs 3c (only one of which is shown in FIG. 1) provided for respective cylinders, a throttle valve mechanism 12, an EGR device 13, and so forth. Both the fuel injection valves 3b and the spark plugs 3c are electrically connected to the ECU 2, and the fuel injection amount and fuel injection timing of fuel injected from each fuel injection valve 3b, and an ignition timing in which a mixture is ignited by each spark plug 3c are controlled by the ECU 2 according to operating conditions of the engine 3.

Further, the throttle valve mechanism 12 includes a throttle valve 12a, and a TH actuator 12b that actuates the throttle valve 12a to open and close the same. The throttle valve 12a is pivotally disposed in an intermediate portion of an intake passage 10 such that the degree of opening thereof is changed by the pivotal motion thereof to thereby change the amount of air passing through the throttle valve 12a. The TH actuator 12b is a combination of a motor (not shown) connected to the ECU 2, and a gear mechanism (not shown), and is controlled by a control signal input from the ECU 2, to thereby change the degree of opening of the throttle valve 12a. This controls the amount of fresh air drawn into each cylinder (hereinafter referred to as the "fresh air amount").

On the other hand, the EGR device 13 recirculates part of exhaust gases from an exhaust passage 11 to the intake passage 10, and comprises an EGR passage 13a which extends between the intake passage 10 and the exhaust passage 11, and an EGR control valve 13b electrically connected to the ECU 2. In the EGR device 13, the EGR control valve 13b is actuated by a control signal input from the ECU 2 to change the degree of opening thereof, whereby the opening area of the EGR passage 13a is changed. This controls the amount of exhaust gases recirculated via the intake passage 10 (hereinafter referred to as the "EGR amount").

The engine 3 has a high compression ratio (e.g. a value of 13), and is configured to be capable of controlling torque generated by the engine 3 such that a net fuel consumption ratio BSFC of the engine 3 is minimized, by causing the EGR device 13 to recirculate exhaust gases lower in temperature than in the case of a low compression ratio engine to the intake passage 10 to suppress occurrence of knocking.

On the other hand, the electric motor 4 is formed by a brushless DC motor, and is electrically connected to the ECU 2 and a battery 16 via a PDU (power drive unit) 15. The PDU 15 is formed by an electric circuit including an inverter and so forth. The ECU 2 controls transmission and reception of electric power between the electric motor 4 and the battery 16 to thereby control an output from the electric motor 4 e.g. during accelerating traveling of the vehicle V and electric power regeneration by the electric motor 4 during decelerating traveling of the vehicle V.

Further, a crank angle sensor 20, an atmospheric pressure sensor 21, an accelerator pedal opening sensor 22, four wheel speed sensors 23 (only one of which is shown), and a current-voltage sensor 24 are electrically connected to the ECU 2. The crank angle sensor 20 is constituted by a magnet rotor and an MRE pickup, and delivers a CRK signal and a TDC signal, which are both pulse signals, to the ECU 2 along with rotation of the crankshaft 3a.

Each pulse of the CRK signal is generated whenever the crankshaft rotates through a predetermined crank angle (e.g. 1°). The ECU 2 calculates a rotational speed NE of the engine 3 (hereinafter referred to as "the engine speed NE") based on the CRK signal. Further, the TDC signal indicates that a piston in one of the cylinders is in a predetermined crank angle position slightly before the TDC position of the intake stroke, and each pulse thereof is delivered whenever the crankshaft rotates through a predetermined crank angle.

Further, the atmospheric pressure sensor 21 (atmospheric pressure-detecting means) is implemented by a semiconductor pressure sensor, and detects atmospheric pressure PA, to deliver a signal indicative of the detected atmospheric pressure PA to the ECU 2. Further, the accelerator pedal opening sensor 22 detects a degree of opening AP of an accelerator pedal (not shown) (hereafter referred to as the "accelerator pedal opening AP"), which is an operation amount of the accelerator pedal, and delivers a signal indicative of the detected accelerator pedal opening AP to the ECU 2.

On the other hand, each of the four wheel speed sensors 23 detects the rotational speed of an associated one of the left and right front wheels 8 and 8 and the left and right rear wheels, and delivers a signal indicative of the detected rotational speed to the ECU 2. The ECU 2 calculates e.g. a vehicle speed VCAR based on the detection signals from the wheel speed sensors 23. Further, the current-voltage sensor 24 detects values of current and voltage input to and output from the battery 16, and delivers signals indicative of the detected current and voltage values to the ECU 2. The ECU 2 calculates the amount of electric power accumulated in the battery 16, i.e. a charge level SOC of the battery 16 based on the detection signals from the current-voltage sensor 24.

Further, the ECU 2 is implemented by a microcomputer comprising a CPU, a RAM, a ROM, and an I/O interface (none of which are specifically shown), and controls the operating conditions of the engine 3 and the electric motor 4 based on the detection signals from the above-described sensors 20 to 24. More specifically, as described hereinafter, the ECU 2 executes various control processes, such as an intake control process, a transmission shift control process, and an electric motor control process.

Note that in the present embodiment, the ECU 2 corresponds to demanded output parameter-calculating means, optimum fuel economy operating point data-calculating means, demanded value-calculating means, and control means.

Next, the intake control process will be described with reference to FIG. 2. As will be described hereinafter, the intake control process is for controlling the EGR amount and the fresh air amount via the EGR device 13 and the throttle valve mechanism 12, respectively, and is executed by the ECU 2 at a predetermined control period (e.g. 10 msec). Note that in the following description, various values calculated are stored in the RAM in the ECU 2.

Figure 2:
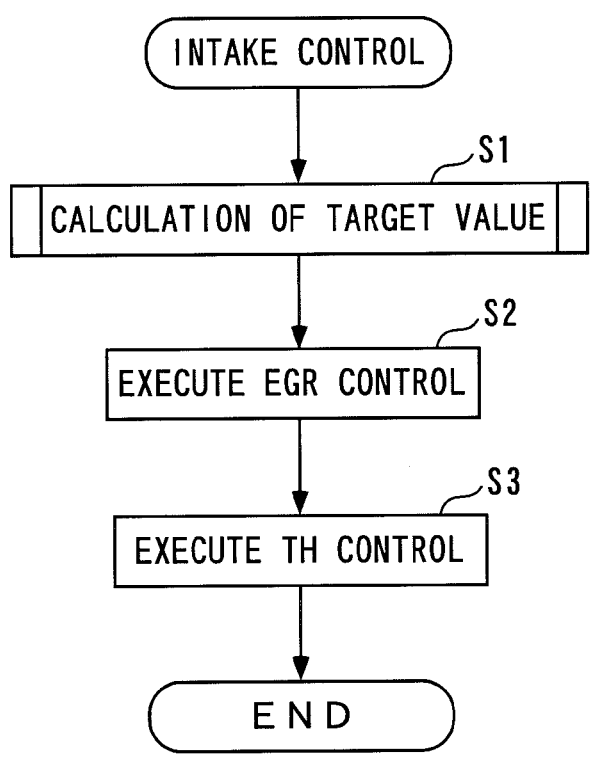
FIG. 2 is a flowchart of an intake control process.

As shown in FIG. 2, first, in a step 1 (shown as S1 in abbreviated form in FIG. 2; the following steps are also shown in abbreviated form), a target value calculation process is executed. This target value calculation process calculates a target EGR amount GEGRCMD and a target fresh air amount GAIRCMD, and detailed description thereof will be given hereinafter.

In a step 2 following the step 1, an EGR control process is executed. Specifically, a value of a control input signal to the EGR control valve 13b is calculated by a predetermined control method according to the target EGR amount GEGRCMD, and the control input signal is supplied to the EGR control valve 13b. This controls the degree of opening of the EGR control valve 13b such that an actual EGR amount becomes equal to the target EGR amount GEGRCMD. In this case, examples of the predetermined control method include a map search method and a method proposed by the present assignee in Japanese Patent Application No. 2011-276307.

Then, the process proceeds to a step 3, wherein a TH control process is executed. Specifically, a value of a control input signal to the TH actuator 12b is calculated by a predetermined control method according to the target fresh air amount GAIRCMD, and the control input signal is supplied to the TH actuator 12b. This controls a throttle valve opening TH such that an actual fresh air amount becomes equal to the target fresh air amount GAIRCMD. In this case, examples of the predetermined control method include a map search method and a method proposed by the present assignee in Japanese Patent Application No. 2011-276307. After execution of the TH control process in the step 3, as described above, the present process is terminated.

Figure 3:
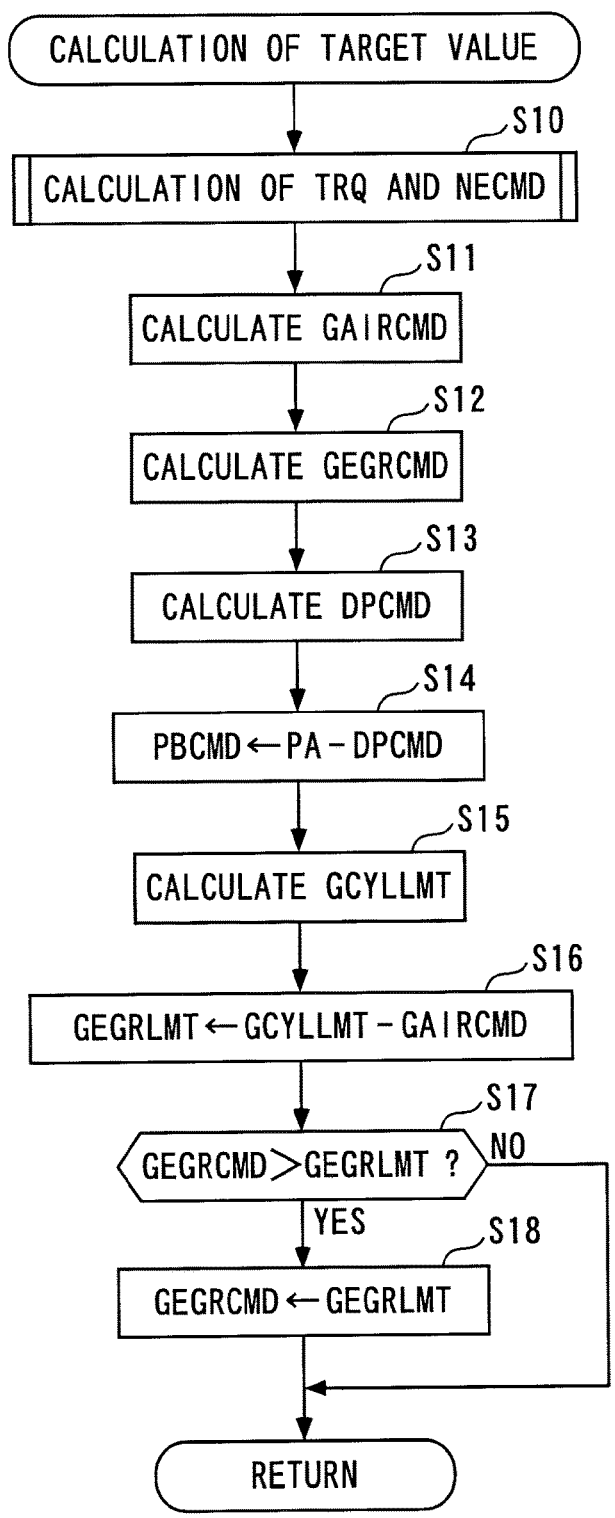
FIG. 3 is a flowchart of a target value calculation process.
Figure 4:
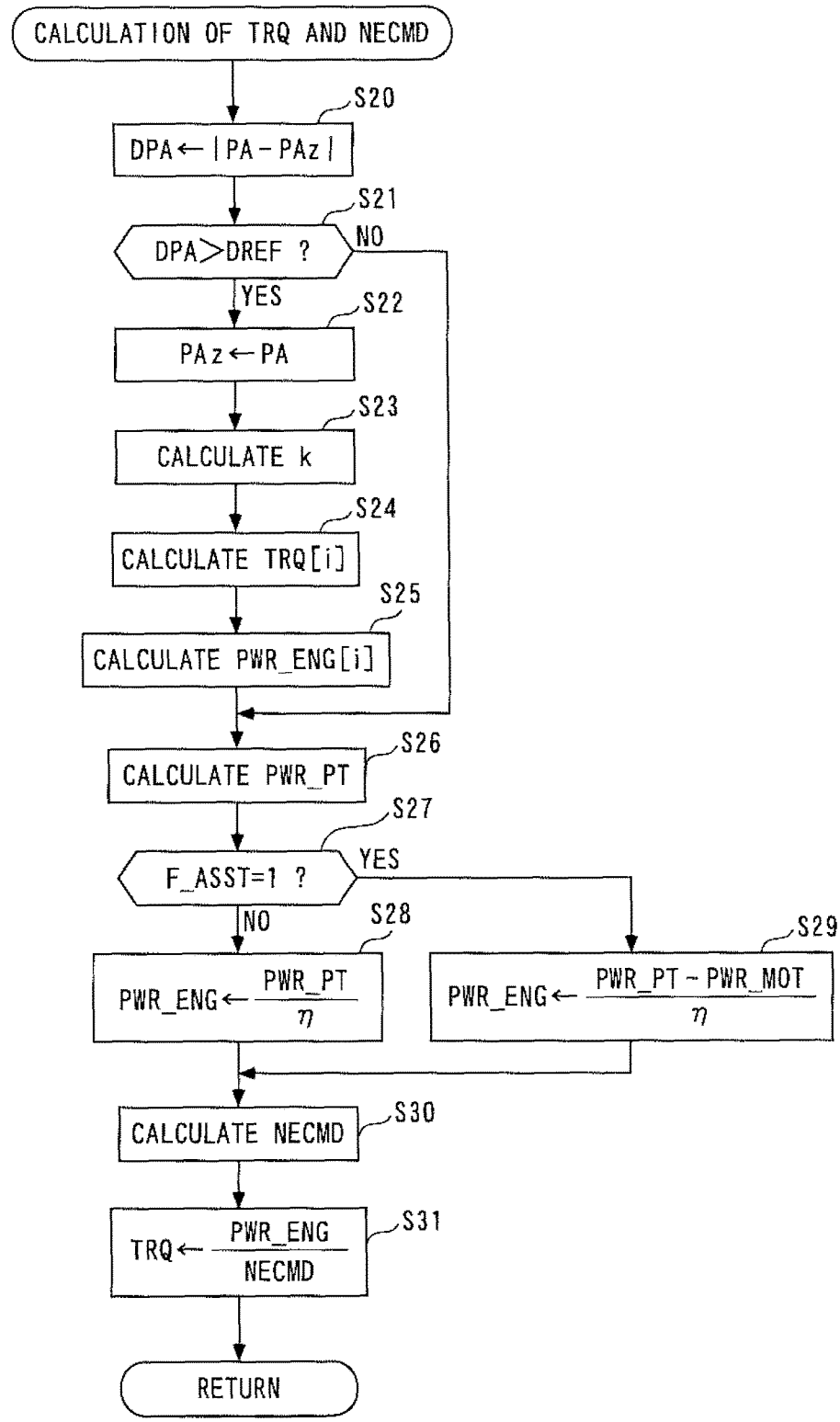
FIG. 4 is a flowchart of a process for calculating a demanded torque and a demanded engine speed.

Next, the above-mentioned target value calculation process will be described with reference to FIG. 3. As shown in FIG. 3, first, in a step 10, a process for calculating a demanded torque TRQ and a demanded engine speed NECMD is executed. This calculation process is specifically executed as shown in FIG. 4. That is, first, in a step 20, the absolute value |PA−PAz| of the difference between the current value of atmospheric pressure and the immediately preceding value thereof is set as an atmospheric pressure difference DPA.

Then, the process proceeds to a step 21, wherein it is determined whether or not the atmospheric pressure difference DPA is larger than a predetermined value DREF. If the answer to this question is negative (NO), it is determined that the atmospheric pressure PA has not changed between the immediately preceding control timing and the current control timing, and the process proceeds to a step 26, referred to hereinafter.

Figure 5:
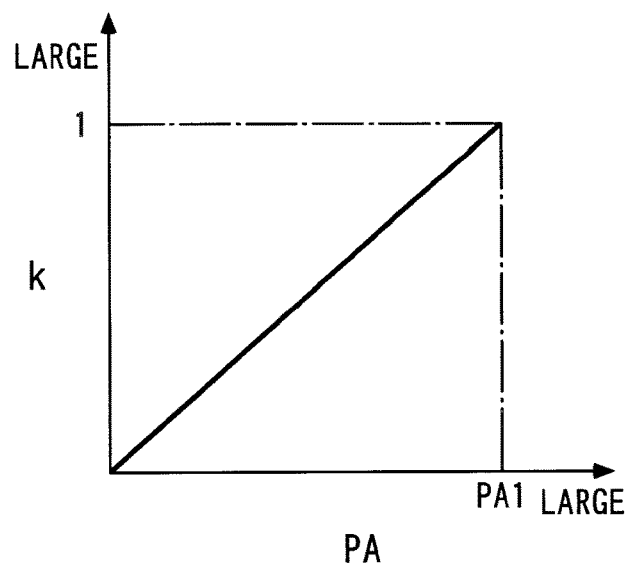
FIG. 5 is a map for use in calculating a weighting factor.

On the other hand, if the answer to the question of the step 21 is affirmative (YES), it is determined that the atmospheric pressure PA has changed between the immediately preceding control timing and the current control timing, and the process proceeds to a step 22, wherein the current value PA of the atmospheric pressure is set as the immediately preceding updated value PAz. Next, the process proceeds to a step 23, wherein a weighting factor k is calculated by searching a map shown in FIG. 5 according to the atmospheric pressure PA. In FIG. 5, PA1 represents a predetermined lowland value (e.g. 760 mmHg) indicative of the atmospheric pressure PA on a lowland. As shown in FIG. 5, in this map, the weighting factor k is set to a larger value as the atmospheric pressure PA is higher, and is set to 1 when PA=PA1 holds. The reason why the weighting factor k is set as above will be described hereinafter.

Next, the process proceeds to a step 24, wherein a map value TRQ[i] of the demanded torque is calculated by the following equation (1). The map value TRQ[i] of the demanded torque is a torque demanded of the engine 3 by a driver (engine demanded torque), and corresponds to a torque which minimizes the fuel consumption ratio of the engine 3 (optimum fuel economy operating point data).

$$TRQ[i]=k \cdot TRQ1[i]+(1-k) \cdot TRQ0[i] \quad (1)$$

In the above equation (1), a value "i" in [ ] is a value set between 1 and n (n is an integer not smaller than 2), and therefore the map value TRQ[i] of the demanded torque is calculated as n values by performing weighted average calculation (i.e. interpolation) on the lowland map value TRQ1[i] of the demanded torque and the highland map value TRQ0[i] of the demanded torque. Further, as is clear from the above equation (1), the weight of the lowland map value TRQ1[i] of the demanded torque can be made larger and at the same time the highland map value TRQ0[i] of the demanded torque can be made smaller, as the weighting factor k is closer to 1, i.e. as the atmospheric pressure PA is closer to the predetermined lowland value PA1. To this end, the weighting factor k is configured as shown in the above-described map in FIG. 5.

Figure 6:
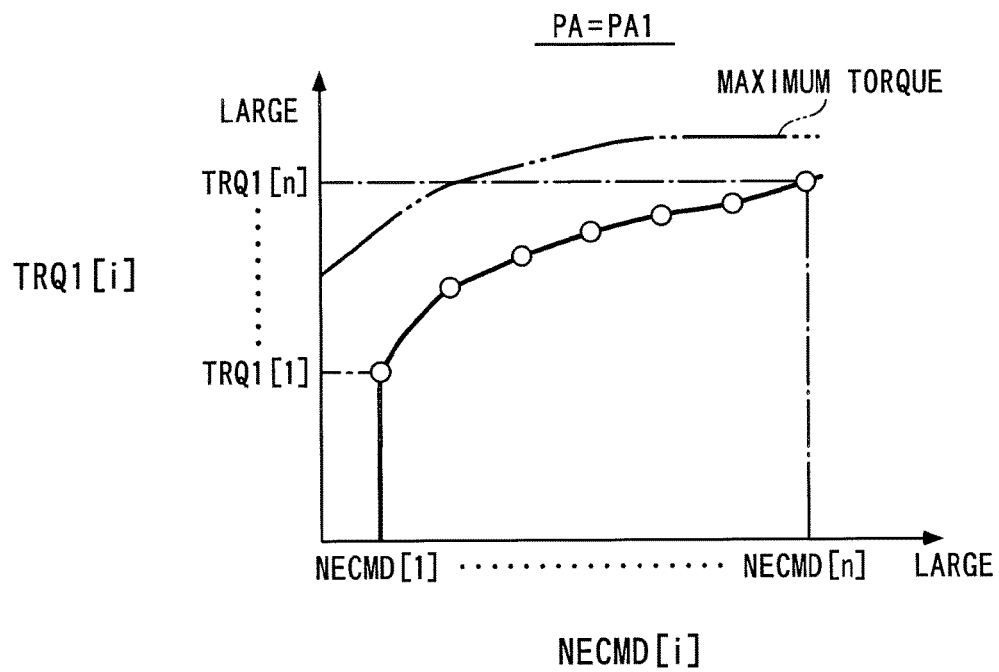
FIG. 6 is a map showing how lowland map values of the demanded torque are set.

Further, as shown in a map in FIG. 6, the lowland map value TRQ1[i] of the demanded torque is set with respect to a map value NECMD[i] of the demanded engine speed. In this map, the lowland map value TRQ1[i] is set as combination data (first operating point data) formed by combining the same and the map value NECMD[i] of the demanded engine speed, which minimizes the fuel consumption ratio of the engine 3 when the atmospheric pressure PA is equal to the predetermined lowland value PA1. Note that data indicated by a two-dot chain line in FIG. 6 represents a maximum torque that can be generated by the engine 3.

Figure 7:
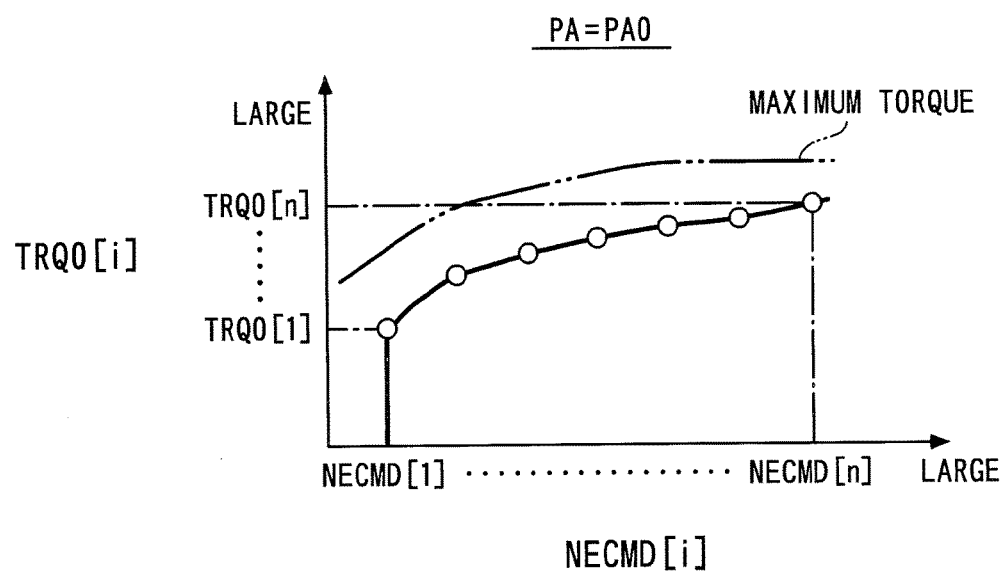
FIG. 7 is a map showing how highland map values of the demanded torque are set.

Furthermore, in the above equation (1), as shown in a map in FIG. 7, the highland map value TRQ0[i] of the demanded torque is set with respect to the map value NECMD[i] of the demanded engine speed. In this map, the highland map value TRQ0[i] is set as combination data (second operating point data) formed by combining the same and the map value NECMD[i] of the demanded engine speed, which minimizes the fuel consumption ratio of the engine when the atmospheric pressure PA is equal to a predetermined highland value PA0. Note that this predetermined highland value PA0 is set to a value of the atmospheric pressure PA at the highest land of all regions where the vehicle V is assumed to be used. Further, data indicated by a two-dot chain line in FIG. 7 represents the maximum torque that can be generated by the engine 3. Furthermore, in the present embodiment, the predetermined lowland value PA1 and the predetermined highland value PA0 correspond to atmospheric pressures PA in first and second predetermined states, respectively.

Figure 8:
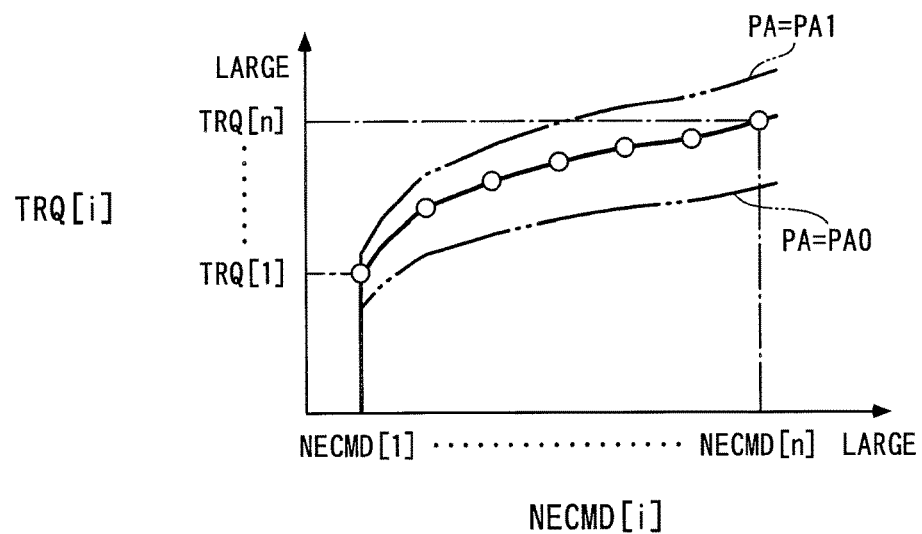
FIG. 8 is a map showing a relationship between calculated map values of the demanded torque and calculated map values of the demanded engine speed.

As described above, in the step 24, the n map values TRQ[i] of the demanded torque are calculated by the weighted average calculation expressed by the above equation (1) in a manner associated with the n map values NECMD[i] of the demanded engine speed, respectively, and are stored in the RAM, whereby a map shown in FIG. 8 is created in the RAM.

Then, in a step 25, a map value PWR_ENG[i] of the engine demanded output is calculated by the following equation (2):

$$PWR\_ENG[i]=(TRQ[i] \cdot NECMD[i] \cdot 2\pi)/(60 \cdot 1000) \quad (2)$$

Figure 9:
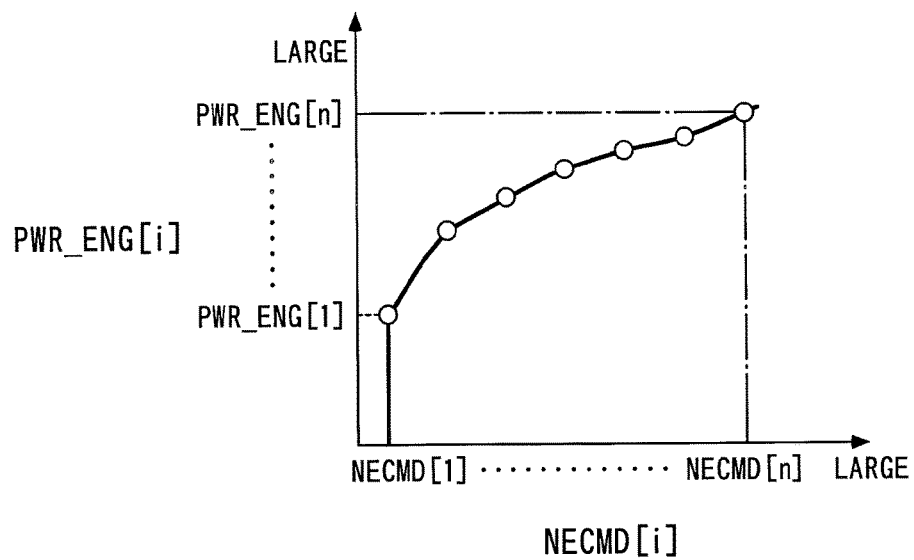
FIG. 9 is a map showing a relationship between calculated map values of engine demanded torque and the calculated map values of the demanded engine speed.

The map value PWR_ENG[i] of the engine demanded output is obtained by converting the map value TRQ[i] of the demanded torque to an engine demanded output value. As described hereinabove, in the step 25, the n map values PWR_ENG[i] of the engine demanded output are calculated in a manner associated with the n map values NECMD[i] of the demanded engine speed, respectively, and are stored in the RAM, whereby a map shown in FIG. 9 is created in the RAM.

In the step 26 following the step 21 or 25, a power train demanded output PWR_PT is calculated by searching a map (not shown) according to the accelerator pedal opening AP. The power train demanded output PWR_PT corresponds to an output demanded of the whole vehicle V by the driver.

Then, the process proceeds to a step 27, wherein it is determined whether or not an assist operation mode flag F_ASST is equal to 1. In a motor control process, described hereinafter, when it is determined, e.g. based on the charge level SOC and the vehicle speed VCAR, that conditions for executing an assist operation mode are satisfied, the assist operation mode flag F_ASST is set to 1, and otherwise set to 0. Note that the assist operation mode is for driving the vehicle V by outputs of both the engine 3 and the electric motor 4.

If the answer to the question of the step 27 is negative (NO), it is determined that the vehicle V should be driven only by the engine output, and the process proceeds to a step 28, wherein the engine demanded output PWR_ENG is set to a value (PWR_PT/η) obtained by dividing the power train demanded output PWR_PT by transmission efficiency η. The engine demanded output PWR_ENG is an output at the end of the crankshaft, and the transmission efficiency η is calculated in a calculation process (not shown) based on the engine speed NE, the engine demanded output PWR_ENG, the temperature of working fluid in the automatic transmission 6, and so forth. Note that in the present embodiment, the engine demanded output PWR_ENG corresponds to a demanded output parameter.

On the other hand, if the answer to the question of the step 27 is affirmative (YES), it is determined that the vehicle V should be driven by the outputs of both the engine 3 and the electric motor 4, and the process proceeds to a step 29, wherein the engine demanded output PWR_ENG is set to a value {(PWR_PT−PWR_MOT)/η} obtained by dividing the difference (PWR_PT−PWR_MOT) between the power train demanded output PWR_PT and a motor demanded output PWR_MOT by the transmission efficiency η. The motor demanded output PWR_MOT is calculated in the motor control process, described hereinafter.

In a step 30 following the above-described step 28 or 29, the demanded engine speed NECMD is calculated by searching the above-described map in FIG. 9 according to the engine demanded output PWR_ENG calculated in the step 28 or 29. Note that in this case, the demanded engine speed NECMD may be calculated using a map obtained by interchanging the vertical axis and the horizontal axis.

Then, the process proceeds to a step 31, wherein the demanded torque TRQ is set to a value (PWR_ENG/NECMD) obtained by dividing the engine demanded output PWR_ENG by the demanded engine speed NECMD, followed by terminating the present process.

Referring again to FIG. 3, in the step 10, the process for calculating the demanded torque TRQ and the demanded engine speed NECMD is executed, as described above, and then the process proceeds to a step 11, wherein the target fresh air amount GAIRCMD is calculated by searching a map (not shown) according to the demanded torque TRQ and the engine speed NE.

Next, the process proceeds to a step 12, wherein the target EGR amount GEGRCMD is calculated by searching a map (not shown) according to the demanded torque TRQ and the engine speed NE.

Figure 10:
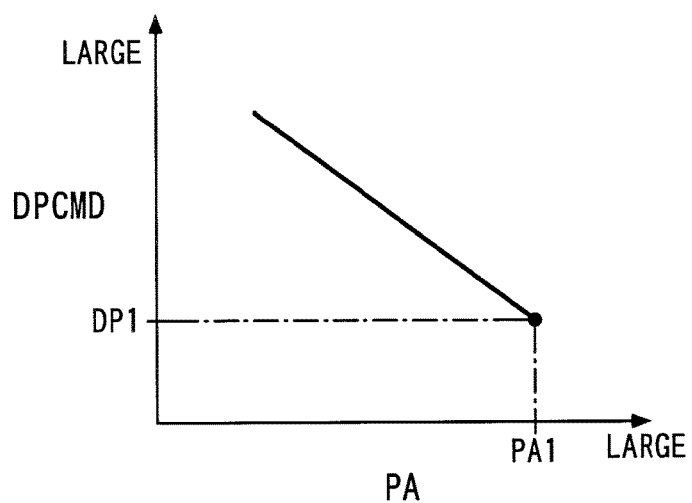
FIG. 10 is a map for use in calculating a required differential pressure.

Next, in a step 13, a required differential pressure DPCMD is calculated by searching a map shown in FIG. 10 according to the atmospheric pressure PA. The required differential pressure DPCMD is a target value of a differential pressure between pressures on the upstream side and the downstream side of the EGR control valve 13b, which is set so as to make it possible to properly secure the EGR amount by the EGR device 13. In this map, the required differential pressure DPCMD is set to a predetermined value DP1 when the atmospheric pressure PA is equal to the above-mentioned predetermined lowland value PA1, and is set to a larger value as the atmospheric pressure PA is lower. This is because in a higher land, the degree of change in the EGR amount with respect to a change in pressure on the downstream side of the EGR control valve 13b becomes larger, and hence a larger differential pressure is required to properly secure the EGR amount.

Figure 11:
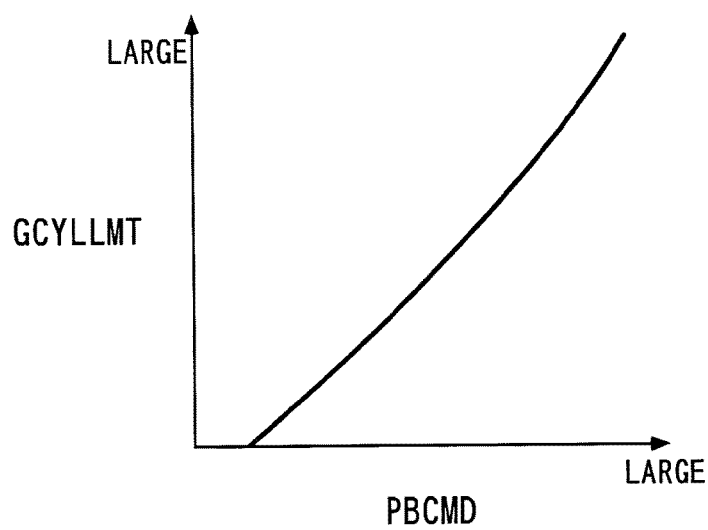
FIG. 11 is a map for use in calculating a limit intake air amount.

In a step 14 following the step 13, a limit intake pressure PBCMD is set to a value obtained by subtracting the required differential pressure DPCMD from the atmospheric pressure PA (PA−DPCMD). After that, the process proceeds to a step 15, wherein a limit intake air amount GCYLLMT is calculated by searching a map shown in FIG. 11 according to the limit intake pressure PBCMD.

Next, in a step 16, a limit EGR amount GEGRLMT is set to a value obtained by subtracting the target fresh air amount GAIRCMD from the limit intake air amount GCYLLMT (GCYLLMT−GAIRCMD). Then, the process proceeds to a step 17, wherein it is determined whether or not the target EGR amount GEGRCMD is larger than the limit EGR amount GEGRLMT.

If the answer to this question is negative (NO), i.e. if GEGRCMD≥GEGRLMT holds, the present process is immediately terminated, whereas if the answer to the question of the step 17 is affirmative (YES), it is determined that it is impossible to secure the EGR amount equal to the calculated target EGR amount GEGRCMD, and the process proceeds to a step 18, wherein the target EGR amount GEGRCMD is set to the limit EGR amount GEGRLMT, followed by terminating the present process.

Figure 12:
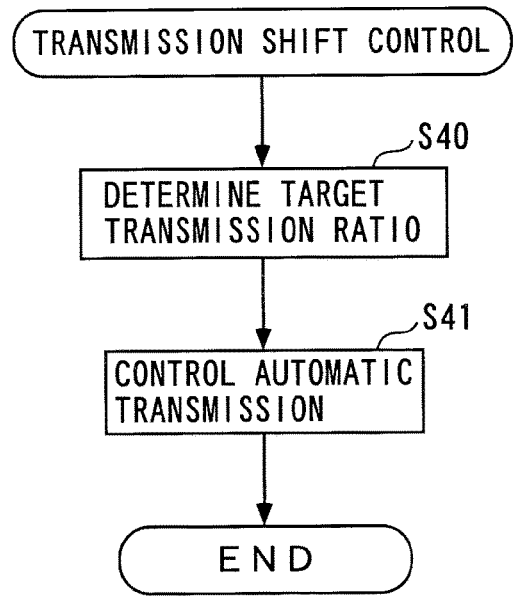
FIG. 12 is a flowchart of a transmission shift control process.

Next, the transmission shift control process will be described with reference to FIG. 12. As will be described hereinafter, the transmission shift control process controls the shift operation of the automatic transmission 6, and is executed by the ECU 2 at a predetermined control period (e.g. 10 msec). As shown in FIG. 12, first, in a step 40, a target transmission ratio is determined by a predetermined control method (e.g. a map search method) according e.g. to the demanded engine speed NECMD and the vehicle speed VCAR.

Next, the process proceeds to a step 41, wherein a control input signal corresponding to the target transmission ratio is delivered to the CVT actuator, to thereby control the automatic transmission 6 such that an actual transmission ratio becomes equal to the target transmission ratio, followed by terminating the present process.

Figure 13:
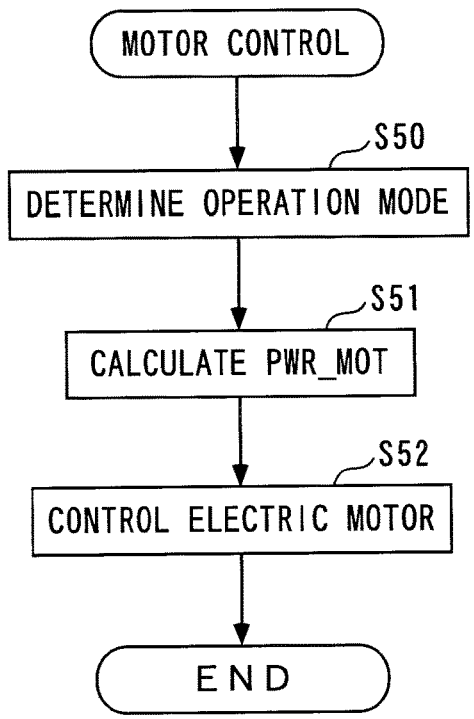
FIG. 13 is a flowchart of a motor control process.

Next, the motor control process will be described with reference to FIG. 13. As described hereinafter, the motor control process controls the operation of the electric motor 4, and is executed by the ECU 2 at a predetermined control period (e.g. 10 msec). As shown in FIG. 13, first, in a step 50, the operation mode of the electric motor 4 is determined by a predetermined control method according e.g. to the vehicle speed VCAR, the degree of acceleration of the vehicle V, the accelerator pedal opening AP, and the charge level SOC. In this case, the operation mode is selected from one of the above-described assist operation mode and a regenerative operation mode for executing electric power regeneration using the electric motor 4.

Then, the process proceeds to a step 51, wherein the above-mentioned motor demanded output PWR_MOT is calculated according to the determined operation mode. Note that the motor demanded output PWR_MOT takes a negative value in the regenerative operation mode.

In a step 52 following the step 51, the operation of the electric motor 4 is controlled such that the motor demanded output PWR_MOT can be obtained, followed by terminating the present process.

Figure 14A:
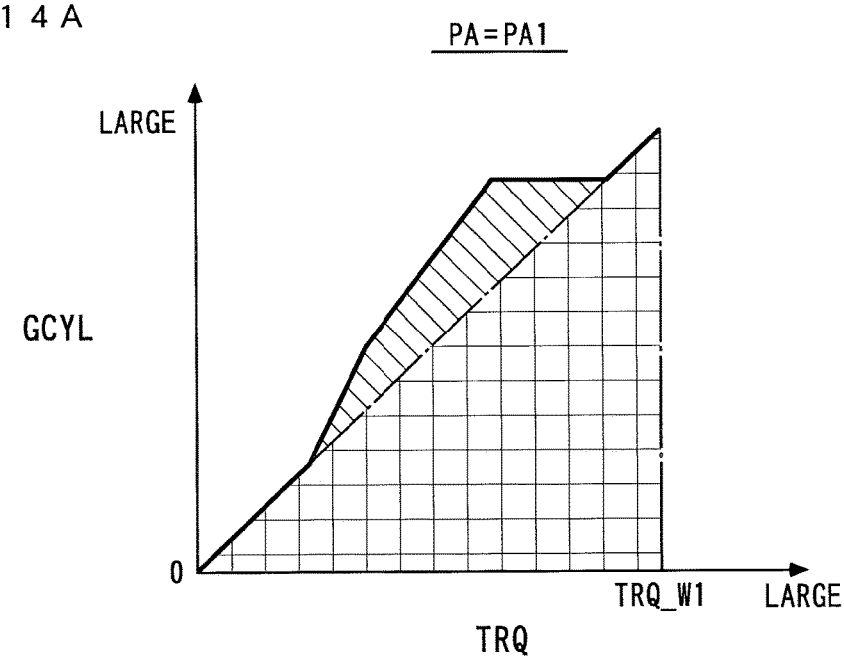
FIG. 14A is a diagram showing the relationship between the demanded torque and an in-cylinder gas amount, obtained when PA=PA1 holds.
Figure 14B:
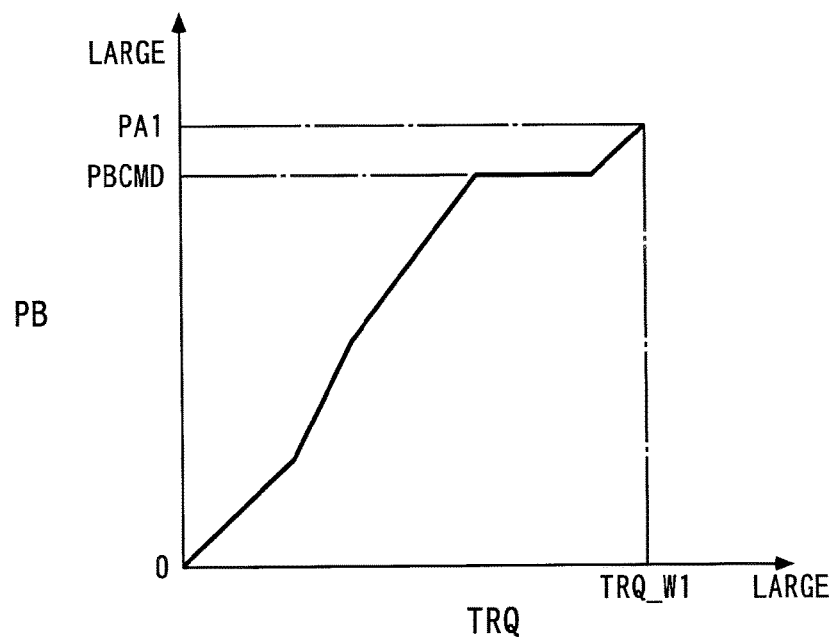
FIG. 14B is a diagram showing a relationship between the demanded torque and an intake pressure, obtained when PA=PA1 holds.

Next, the reason for calculating the demanded torque TRQ and the demanded engine speed NECMD by the above-described calculation method according to the present embodiment, and the principle of the calculation method will be described with reference to FIGS. 14 to 16. First, FIGS. 14A and 14B show the relationship between an in-cylinder gas amount GCYL and the demanded torque TRQ and the relationship between an intake pressure PB and the demanded torque TRQ, respectively, under conditions where the vehicle V is traveling on a lowland road, and PA=PA1 holds. In this case, the in-cylinder gas amount GCYL represents the total gas amount which is the sum of the EGR amount and the fresh air amount in each cylinder of the engine 3, and in FIG. 14A, an area indicated by hatching represents the EGR amount, and a region indicated by lattice represents the fresh air amount. Further, the intake pressure PB represents a pressure in the intake passage 10 on the downstream side of the throttle valve 12a. Further, a value TRQ_W1 represents the demanded torque TRQ in the wide-open throttle state of the throttle valve 12a under the condition where PA=PA1 holds.

Further, FIGS. 15A and 15B show the relationship between the in-cylinder gas amount GCYL and the demanded torque TRQ and the relationship between the intake pressure PB and the demanded torque TRQ, respectively, under conditions where the vehicle V is traveling on a highland road and PA=PAm holds. In FIG. 15A, the value PAm is such a predetermined value of the atmospheric pressure PA as will make it possible to satisfy the relationship of PA0<PAm<PA1, and the value TRQ_Wm is a value of the demanded torque TRQ in the wide-open throttle state of the throttle valve 12a under the condition where PA=PAm holds. As is apparent from the comparison between FIGS. 14 and 15, when the vehicle V is traveling on a highland road, the atmospheric pressure PA becomes lower than on a lowland road, so that the limit intake pressure PBCMD above which it is possible to properly introduce recirculated gases into the cylinders becomes lower. This causes lowering of the value of the demanded torque TRQ at which the maximum EGR amount can be introduced.

Figure 16A:
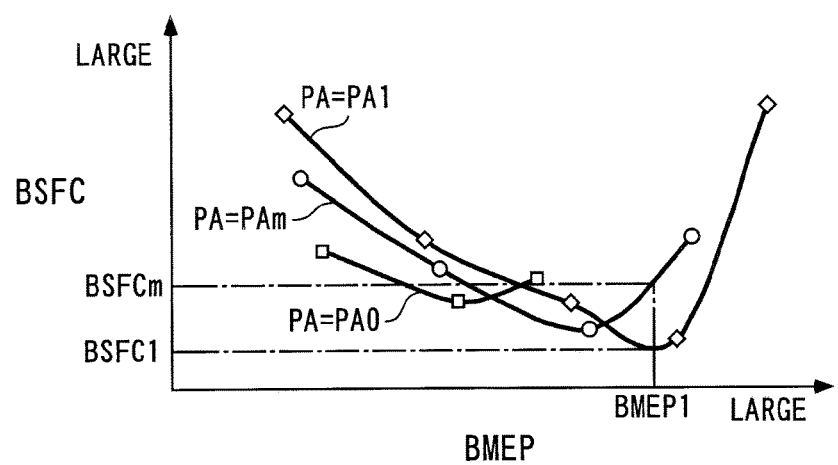
FIG. 16A is a diagram showing relationships between a net average effective pressure and a net fuel consumption ratio, obtained when PA=PA0, PAm, PA1 holds, respectively.
Figure 16B:
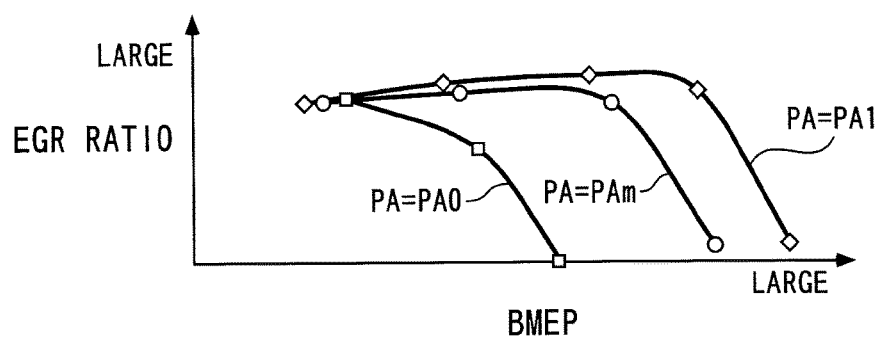
FIG. 16B is a diagram showing relationships between the net average effective pressure and an EGR ratio, obtained when PA=PA0, PAm, PA1 holds, respectively.

As a consequence, under the conditions where PA=PA0, PAm and PA1 holds, the relationships between the net fuel consumption ratio BSFC and a net average effective pressure BMEP and the relationships between an EGR ratio and the net average effective pressure BMEP are as shown in FIGS. 16A and 16B, respectively. As shown in FIG. 16A, under the condition where PA=PA1 holds, when the net average effective pressure BMEP is equal to a predetermined value BMEP1, the net fuel consumption ratio BSFC takes a minimum value BSFC1 thereof, whereas under the condition where PA=PAm holds, a value BSFCm of the net fuel consumption ratio BSFC, taken when BMEP=BMEP1 holds, becomes larger than the minimum value BSFC1.

More specifically, under a condition where PA>PA1 holds, when the engine 3 is controlled using the above-described FIG. 6 map, the demanded torque TRQ deviates from a value at which the net fuel consumption ratio BSFC takes its minimum value, which results in the degraded fuel consumption. To avoid this inconvenience and ensure excellent fuel economy, in the present embodiment, as described hereinabove, the weighting factor k is calculated based on the atmospheric pressure PA, and the weighted average calculation using the weighting factor k is performed on the map data of the demanded torques TRQ in FIGS. 6 and 7, whereby such map data of the demanded torque TRQ as shown in FIG. 8 is created. The demanded torque TRQ and the demanded engine speed NECMD are calculated using the FIG. 9 map which is formed by converting the FIG. 8 map data of the demanded torque TRQ to the engine demanded output values.

As described heretofore, according to the control system 1 of the present embodiment, in the step 24 in FIG. 4, n map values TRQ[i] which minimizes the fuel consumption ratio under the detected atmospheric pressure PA are calculated by performing the weighted average calculation on the detected atmospheric pressure PA on the n map data items which defines the relationship between the demanded engine speeds NECMD[i] and the demanded torques TRQ1[i] such that the fuel consumption ratio obtained when PA=PA1 holds is minimized and the n map data items which defines the relationship between the demanded engine speeds NECMD[i] and the demanded torques TRQ0[i] such that the fuel consumption ratio obtained when PA=PA0 holds is minimized. This makes it possible to calculate the n map values TRQ[i] more quickly than when the process for searching for an optimum operating point is repeatedly executed as disclosed in Japanese Laid-Open Patent Publication (Kokai) No. 2006-193137.

Further, in the step 25, the map values PWR_ENG[i] of the engine demanded output are calculated by converting the map values TRQ[i] to the engine demanded output values to create the map shown in FIG. 9. Then, the power train demanded output PWR_PT is calculated by searching this map, and the demanded torque TRQ and the demanded engine speed NECMD are calculated using the power train demanded output PWR_PT. Further, the engine 3 is controlled using the demanded torque TRQ, and the automatic transmission 6 is controlled using the demanded engine speed NECMD. Therefore, it is possible to operate the engine 3 in a state where the fuel consumption ratio is minimized with respect to the detected atmospheric pressure PA. This makes it possible to quickly and properly secure excellent fuel economy of the engine 3 even when the atmospheric pressure PA changes between the predetermined lowland value PA1 and the predetermined highland value PA0.

Furthermore, in the step 12, the target EGR amount GEGRCMD is calculated according to the demanded torque TRQ calculated as described above, so that when PA<PA1 holds, the target EGR amount GEGRCMD takes a smaller value than when PA=PA1 holds. As a consequence, when the vehicle V is traveling in a region higher than lowlands, the EGR amount is controlled to be smaller than when the vehicle V is traveling on the lowlands, so that it is possible to properly secure torque represented by a demanded torque parameter even in such a region, whereby it is possible to ensure excellent fuel economy.

In addition to this, in the step 26, when the assist operation mode flag F_ASST is equal to 1, the engine demanded output PWR_ENG is set to a value $\{(PWR\_PT-PWR\_MOT)/\eta\}$ obtained by dividing the difference (PWR_PT−PWR_MOT) between the power train demanded output and the motor demanded output by the transmission efficiency η. That is, since the engine 3 is assisted by the electric motor 4, the engine demanded output PWR_ENG can be set to a smaller value, so that the demanded torque TRQ and the demanded engine speed NECMD can be set to smaller values, which makes it possible to further improve the fuel economy.

Although in the above-described embodiment, the engine demanded output PWR_ENG is used as the demanded output parameter, by way of example, the demanded output parameter according to the present invention is not limited to this, but any suitable demanded output parameter may be employed insofar as it can represent an output demanded of the engine. For example, the power of the engine may be used as the demanded output parameter.

Further, although in the above-described embodiment, the demanded torque TRQ is used as the torque parameter, by way of example, the torque parameter according to the present invention is not limited to this, but any suitable torque parameter may be employed insofar as it can represent torque to be generated by the engine. For example, a value obtained by dividing the output of the engine by the engine speed NE may be used as the torque parameter.

Further, although in the above-described embodiment, the control system according to the present invention is applied to the engine installed on a hybrid vehicle, by way of example, this is not limitative, but it can be applied to various types of engines, such as an engine installed on a vehicle using only the engine as a motive power source or engines installed on other industrial machines.

It is further understood by those skilled in the art that the foregoing are preferred embodiments of the invention, and that various changes and modifications may be made without departing from the spirit and scope thereof.

What is claimed is:

1. A control system for an internal combustion engine that is installed in a vehicle as a motive power source and where an amount of recirculated exhaust gases is changed by an EGR control valve of an EGR device, comprising:
    atmospheric pressure-detecting means for detecting atmospheric pressure;
    demanded output parameter-calculating means for calculating a demanded output parameter indicative of an output demanded of the engine, using a power train demanded output corresponding to an output demanded of the whole vehicle by a driver and a transmission efficiency of the vehicle;
    optimum fuel economy operating point data-calculating means having a memory storing, on a coordinate plane in which an engine speed as a rotational speed of the engine and a torque parameter indicative of torque to be generated by the engine are set as coordinate axes, a plurality of first operating point data items that define a relationship between the engine speed and the torque parameter such that a fuel consumption ratio in a first predetermined state of the atmospheric pressure is minimized, and a plurality of second operating point data items that define a relationship between the engine speed and the torque parameter such that the fuel consumption ratio in a second predetermined state of the atmospheric pressure which is different from the first predetermined state is minimized, for calculating a plurality of optimum fuel economy operating point data items that minimize the fuel consumption ratio under a detected atmospheric pressure, by performing interpolation on the plurality of first operating point data items and the plurality of second operating point data items, based on the detected atmospheric pressure;
    demanded value-calculating means for calculating a demanded torque parameter demanded as the torque parameter and a demanded engine speed demanded as the engine speed, using the calculated optimum fuel economy operating point data items and the calculated demanded output parameter; and
    control means for controlling the engine using the calculated demanded torque parameter,
    wherein said control means has
    required differential pressure-calculating means for calculating a required differential pressure that is a target value of a differential pressure between pressures on an upstream side and a downstream side of said EGR control valve, according to the detected atmospheric pressure, and
    EGR control means for controlling the amount of exhaust gases recirculated by said EGR device, using the calculated required differential pressure and the calculated demanded torque parameter.

2. The control system as claimed in claim 1,
    wherein the first predetermined state is set to a state of the atmospheric pressure on a lowland, and the second predetermined state is set to a state of the atmospheric pressure on a region higher than the lowland, and
    wherein said EGR control means controls the amount of exhaust gases recirculated by said EGR device, using the required differential pressure and the demanded torque parameter, such that when the atmospheric pressure is closer to the second predetermined state than to the first predetermined state, the amount of recirculated gases is made smaller than when the atmospheric pressure is in the first predetermined state.

3. The control system as claimed in claim 1, wherein the first predetermined state is set to a state of the atmospheric pressure on a lowland, and the second predetermined state is set to a state of the atmospheric pressure on a highest land in regions where the engine is assumed to be used.

4. The control system as claimed in claim 2, wherein the first predetermined state is set to a state of the atmospheric pressure on a lowland, and the second predetermined state is set to a state of the atmospheric pressure on a highest land in regions where the engine is assumed to be used.

5. The control system as claimed in claim 1, wherein the engine is used as a motive power source of a vehicle including an automatic transmission, and
    wherein said control means controls an operating state of the automatic transmission using the demanded engine speed.

6. The control system as claimed in claim 2, wherein the engine is used as a motive power source of a vehicle including an automatic transmission, and
    wherein said control means controls an operating state of the automatic transmission using the demanded engine speed.

7. The control system as claimed in claim 3, wherein the engine is used as a motive power source of a vehicle including an automatic transmission, and
    wherein said control means controls an operating state of the automatic transmission using the demanded engine speed.

8. The control system as claimed in claim 4, wherein the engine is used as a motive power source of a vehicle including an automatic transmission, and
    wherein said control means controls an operating state of the automatic transmission using the demanded engine speed.

* * * * *